United States Patent
Ueda et al.

(10) Patent No.: US 6,607,855 B2
(45) Date of Patent: Aug. 19, 2003

(54) CONTROL SYSTEM FOR FUEL CELL

(75) Inventors: Kenichiro Ueda, Wako (JP); Yoshikazu Murakami, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 321 days.

(21) Appl. No.: 09/814,770

(22) Filed: Mar. 23, 2001

(65) Prior Publication Data

US 2002/0160243 A1 Oct. 31, 2002

(30) Foreign Application Priority Data

Mar. 24, 2000 (JP) ........................................ 2000-085292

(51) Int. Cl.$^7$ ................................................ H01M 8/04
(52) U.S. Cl. ............................................ 429/24; 429/22
(58) Field of Search ............................ 429/17–22, 23–24

(56) References Cited

U.S. PATENT DOCUMENTS

| | | | |
|---|---|---|---|
| 5,877,600 A | * 3/1999 | Sonntag | 318/139 |
| 5,985,474 A | * 11/1999 | Chen | 429/17 |
| 6,051,192 A | * 4/2000 | Maston | 422/110 |
| 6,162,557 A | * 12/2000 | Kraaij | 429/17 |
| 6,165,633 A | * 12/2000 | Negishi | 429/17 |
| 6,183,895 B1 | * 2/2001 | Kudo | 429/20 |
| 6,277,508 B1 | * 8/2001 | Reiser | 429/17 |

FOREIGN PATENT DOCUMENTS

| | | |
|---|---|---|
| JP | 06-076846 | 3/1994 |
| JP | 07-014598 | 1/1995 |
| JP | 11-031521 | 2/1999 |

\* cited by examiner

*Primary Examiner*—Mark Ruthkosky
(74) *Attorney, Agent, or Firm*—Arent Fox Kintner Plotkin & Kahn, PLLC

(57) ABSTRACT

A control system for a fuel cell includes a vapor generation unit, a fuel reforming unit, a fuel supply unit, a combustion unit, a fuel vapor temperature detection unit, a temperature detection unit, a current detection unit, and a control unit. The vapor generation unit produces a fuel vapor by vaporizing a liquid fuel. The fuel reforming unit reforms the fuel vapor to produce a hydrogen-enriched fuel. The fuel supply unit supplies the reformed fuel to the fuel cell. The control unit calculates quantity of heat retained by the vapor generation unit based on the temperature of the fuel vapor, the temperature of the combustion unit, and the generated current. The control unit also controls a fuel supply command value for the fuel supply unit and/or a current generation command value for the fuel cell based on the calculated quantity of heat retained by the vapor generation unit.

4 Claims, 4 Drawing Sheets

CONTROL SYSTEM FOR FUEL CELL

BACKGROUND OF THE INVENTION

1. Field of the Invention

The present invention relates to a control system for a fuel cell. More specifically, the present invention relates to a control system for a fuel cell which controls a fuel supply to a fuel cell and an output from the fuel cell which may be provided with a reforming device.

2. Description of Related Art

A conventional solid polymer membrane type fuel cell includes a cell in which a solid polymer electrolyte membrane is sandwiched by an anode and a cathode, and a stack is formed by a plurality of laminated cells (hereinafter referred to as a fuel cell). In general, hydrogen is supplied to the anode as a fuel and air is supplied to the cathode as an oxidizing agent so that hydrogen ions generated at the anode by a catalytic reaction pass through the solid polymer electrolyte membrane and move to the cathode to electrochemically react with oxygen to generate power.

A fuel cell unit provided with a reforming device is disclosed, which utilizes an alcohol type compound, such as methanol, or a hydrocarbon type compound, such as gasoline, as a raw material and produces a hydrogen-enriched fuel by modifying such raw materials, for instance, in the Japanese Unexamined Patent Application, First Publication No. 6-76846.

In such a fuel cell unit including a reforming device, a discharged fuel from the fuel cell is transferred to a combustion unit in which it is to be burned and the heat generated in the combustion unit is utilized to vaporize raw fuel materials in a vapor generation unit. The fuel vapor produced in the vapor generation unit is supplied to the reforming unit.

However, in the above-mentioned example of the conventional fuel cell unit, there are problems that, for instance, a current required for a fuel cell unit cannot be obtained immediately when a load is being increased and more current is needed. That is, there is a certain time delay (or lag time) between, for instance, the increase of the amount of the raw fuel materials supplied to the vapor generation unit and the time that the output of the fuel cell which corresponds to the required current is generated. Accordingly, the response to the load cannot be appropriately controlled if this time delay is not properly apprehended.

Also, if an excessive amount of the raw fuel materials are supplied to the vapor generation unit exceeding the certain vaporization capacity of the unit when a relatively large current is required to be generated, the raw fuel materials which were not vaporized remains in the vapor generation unit. The remaining raw fuel materials may prevent a stable control of the fuel cell.

The present invention was achieved in consideration of the above problems and its objectives include providing a control system for a fuel cell, which is capable of improving the responsiveness to the load change by appropriately carrying out a fuel supply process and suitably outputting a current generation command.

SUMMARY OF THE INVENTION

The present invention provides a control system for a fuel cell, including a vapor generation unit which produces a fuel vapor by vaporizing a liquid fuel; a fuel reforming unit which reforms the fuel vapor so as to produce a hydrogen-enriched reformed fuel; a fuel supply unit which supplies the hydrogen-enriched reformed fuel from the fuel reforming unit to the fuel cell; a combustion unit which burns a discharged fuel discharged from the fuel cell and supplies to the vapor generation unit a quantity of heat generated by burning the discharged fuel; a fuel vapor temperature detection unit which detects the temperature of the fuel vapor; a temperature detection unit which detects the temperature of the combustion unit; a current detection unit which detects the current generated by the fuel cell; and a control unit which calculates quantity of heat retained by the vapor generation unit utilized for vaporizing the liquid fuel based on the temperature of the fuel vapor, the temperature of the combustion unit, and the generated current, the control unit controlling a fuel supply command value for the fuel supply unit and/or a current generation command value for the fuel cell based on the calculated quantity of heat retained by the vapor generation unit.

According to the above control system for a fuel cell, it becomes possible to accurately calculate the fuel supply command value and the current generation command value in accordance with the estimated quantity of heat retained by the vapor generation unit. Accordingly, the output responsiveness and the current generation efficiency of the fuel cell may be improved.

In accordance with another aspect of the invention, the control unit sets a control constant for the fuel supply command value and/or the current generation command value, the control constant including at least one of a lag time, a time constant, and an acceleration rate.

According to the above control system for a fuel cell using the control unit, the output responsiveness and the current generation efficiency of the fuel cell may be further improved by setting the lag time, the time constant, and the acceleration rate.

The present invention also provides a vehicle utilizing a fuel cell as an energy source, including a control system for the fuel cell which includes: a vapor generation unit which produces a fuel vapor by vaporizing a liquid fuel; a fuel reforming unit which reforms the fuel vapor so as to produce a hydrogen-enriched reformed fuel; a fuel supply unit which supplies the hydrogen-enriched reformed fuel from the fuel reforming unit to the fuel cell; a combustion unit which burns a discharged fuel discharged from the fuel cell and supplies to the vapor generation unit a quantity of heat generated by burning the discharged fuel; a fuel vapor temperature detection unit which detects the temperature of the fuel vapor; a temperature detection unit which detects the temperature of the combustion unit; a current detection unit which detects the current generated by the fuel cell; and a control unit which calculates quantity of heat retained by the vapor generation unit utilized for vaporizing the liquid fuel based on the temperature of the fuel vapor, the temperature of the combustion unit, and the generated current, the control unit controlling a fuel supply command value for the fuel supply unit and/or a current generation command value for the fuel cell based on the calculated quantity of heat retained by the vapor generation unit.

In accordance with another aspect of the invention, the control unit provided with the above vehicle sets a control constant for the fuel supply command value and/or the current generation command value, the control constant comprising at least one of a lag time, a time constant, and an acceleration rate.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Figure 1:
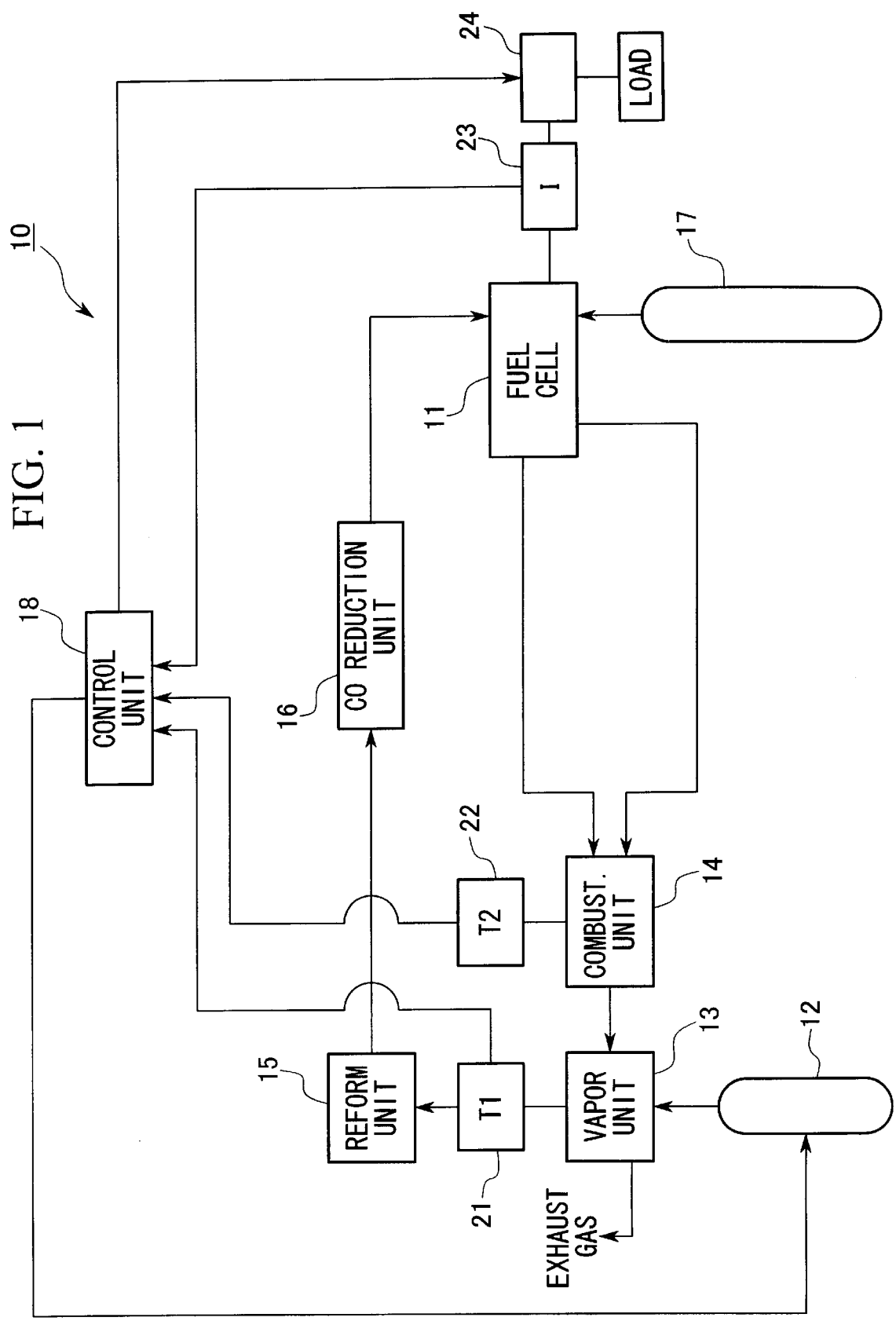
FIG. 1 is a diagram showing a schematic configuration of a control system for a fuel cell according to an embodiment of the present invention.

FIG. 1 is a diagram showing a schematic configuration of a control system 10 for a fuel cell according to an embodiment of the present invention.

The control system 10 for a fuel cell according to this embodiment of the present invention includes a fuel cell 11, a fuel supply unit 12, a vapor generation unit 13, a combustion unit 14, a reforming unit 15, a CO reduction unit 16, an oxidizing agent supply unit 17, a control unit 18, a fuel vapor temperature detector 21, a combustion unit temperature detector 22, a generated electric current detection unit 23, and an output control unit 24. The fuel supply unit 12 supplies a liquid fuel made of, for instance, a mixture of methanol and water. The vapor generation unit 13 produces a fuel vapor by vaporizing the liquid fuel. The combustion unit 14 produces a combustion gas which is utilized for a hot air supplied to the vapor generation unit 13 and for vaporizing the liquid fuel. The reforming unit 15 produces a hydrogen-enriched reformed fuel from the fuel vapor. The CO reduction unit 16 removes carbon monoxide contained in the reformed fuel by selectively oxidizing it. The oxidizing agent supply unit 17 supplies an oxidizing agent, such as air, to the fuel cell 11.

The fuel cell 11 includes a stack which is formed by a plurality of laminated cells, and in each cell a solid polymer electrolyte membrane made of a solid polymer-ion exchange membrane for instance, is sandwiched by an anode and a cathode. The fuel cell 11 includes a fuel electrode (e.g., a hydrogen electrode) to which hydrogen is supplied as a fuel and an air electrode to which, for instance, air containing oxygen is supplied as an oxidizing agent.

Each of the fuel electrode and the air electrode has an outlet for discharging unreacted fuel or oxidizing agent and each outlet is connected to the combustion unit 14 via a pipe arrangement.

The fuel supply unit 12 supplies a liquid fuel to the vapor generation unit 13. The liquid fuel may be prepared by, for instance, mixing a fuel made of an alcohol type compound, such as methanol, or a hydrocarbon type compound, such as ethane, methane, or gasoline, with water at a predetermined ratio.

The vapor generation unit 13 includes, for instance, a vaporizer having a nozzle for supplying the liquid fuel, and the liquid fuel sprayed from the nozzle is vaporized by heat generated from a combustion gas which is supplied from the combustion unit 14.

The combustion unit 14 includes, for instance, a nozzle and an ignition source, and a catalyst for combustion is provided with the combustion unit 14. The nozzle is used for introducing a discharged fuel, which contains unreacted hydrogen discharged from the fuel electrode of the fuel cell, and a discharged oxidizing agent, which contains unreacted oxygen discharged from the air electrode to the combustion unit 14. The catalyst for combustion is used for stabilizing a combustion state of the discharged fuel and the discharged oxidizing agent. The ignition source of the combustion unit 14 may be an electric heater. The combustion gas generated by the combustion of the discharged fuel and the discharged oxidizing agent is supplied to the vapor generation unit 13.

In the reforming unit 15, a reforming catalyst, for instance, is provided so that a reformed fuel having a high content of hydrogen (i.e., a hydrogen-enriched fuel) may be produced from the fuel vapor by a reaction catalyzed by the reforming catalyst.

For instance, if a fuel vapor containing a mixture of methanol and water is used, a reformed fuel containing hydrogen, water, and carbon monoxide is produced as shown in the following reaction formulae (1) through (3).

$$CH_3OH+H_2O \rightarrow 3H_2+CO_2 \quad (1)$$

$$CH_3OH+2O_2 \rightarrow 2H_2O+CO_2 \quad (2)$$

$$CH_3OH \rightarrow 2H_2+CO \quad (3)$$

A reforming reaction between methanol and water is expressed in the formula (1) and hydrogen, which is used as a fuel later on, is produced. An oxidation reaction of methanol is expressed in the formula (2) and supplies calories required by the above reaction (1) which is an endothermic reaction.

An inevitable decomposing reaction of methanol is expressed in the formula (3) in which carbon monoxide is produced. Since carbon monoxide causes catalyst poisoning of, for instance, a Pt catalyst contained in the fuel cell 11 and decreases the power generation efficiency and the lifetime of the fuel cell 11, it is removed by means of the CO reduction unit 16.

The CO reduction unit 16 includes a selective oxidation catalyst made of, for instance, Pt or Ru and removes carbon monoxide contained in the reformed fuel by selectively oxidizing carbon monoxide as shown in the following reaction formula (4):

$$2CO+O_2 \rightarrow 2CO_2 \quad (4)$$

The reformed fuel in which the content of carbon monoxide is reduced is supplied to the fuel electrode of the fuel cell 11.

The oxidizing agent supply unit 17 supplies, for instance, air containing oxygen as an oxidizing agent to the air electrode of the fuel cell 11.

In the fuel cell 11, hydrogen (i.e., a fuel) in the reformed fuel and the oxidizing agent (i.e., oxygen) are electrochemically reacted to generate electricity.

The control unit 18 controls the amount of liquid fuel supplied and the timing to supply the liquid fuel, etc., by taking into account the time delay between the generation of a signal requiring the power in accordance with a command based on, for instance, the operation of an accelerator pedal of an electric vehicle and the actual generation of the power.

For this reason, the control unit 18 receives a signal from the fuel vapor temperature detector 21, which detects the temperature T1 of a fuel vapor produced in the vapor generation unit 13; a signal from the combustion unit temperature detector 22, which detects the temperature T2 of the combustion unit 14 for burning the discharged fuel from the fuel cell 11; and a signal from the generated electric current detection unit 23, which detects the current 1 generated by the fuel cell 11.

The control unit 18 then outputs, for instance, a fuel injection command value to the fuel supply unit 12 and an electric power command value to the output control unit 24 to carry out an output control against a load. The output control unit 24 may include, for instance, a DC-DC converter, an inverter, and so forth.

Next, the operation of the control system 10 for a fuel cell according to an embodiment of the present invention having the above-mentioned configuration will be explained with reference to the accompanying drawings. Especially, processes for calculating fuel supply command values for the fuel supply unit 12 and command values for current generated by the fuel cell 11 will be described in detail.

Figure 2:
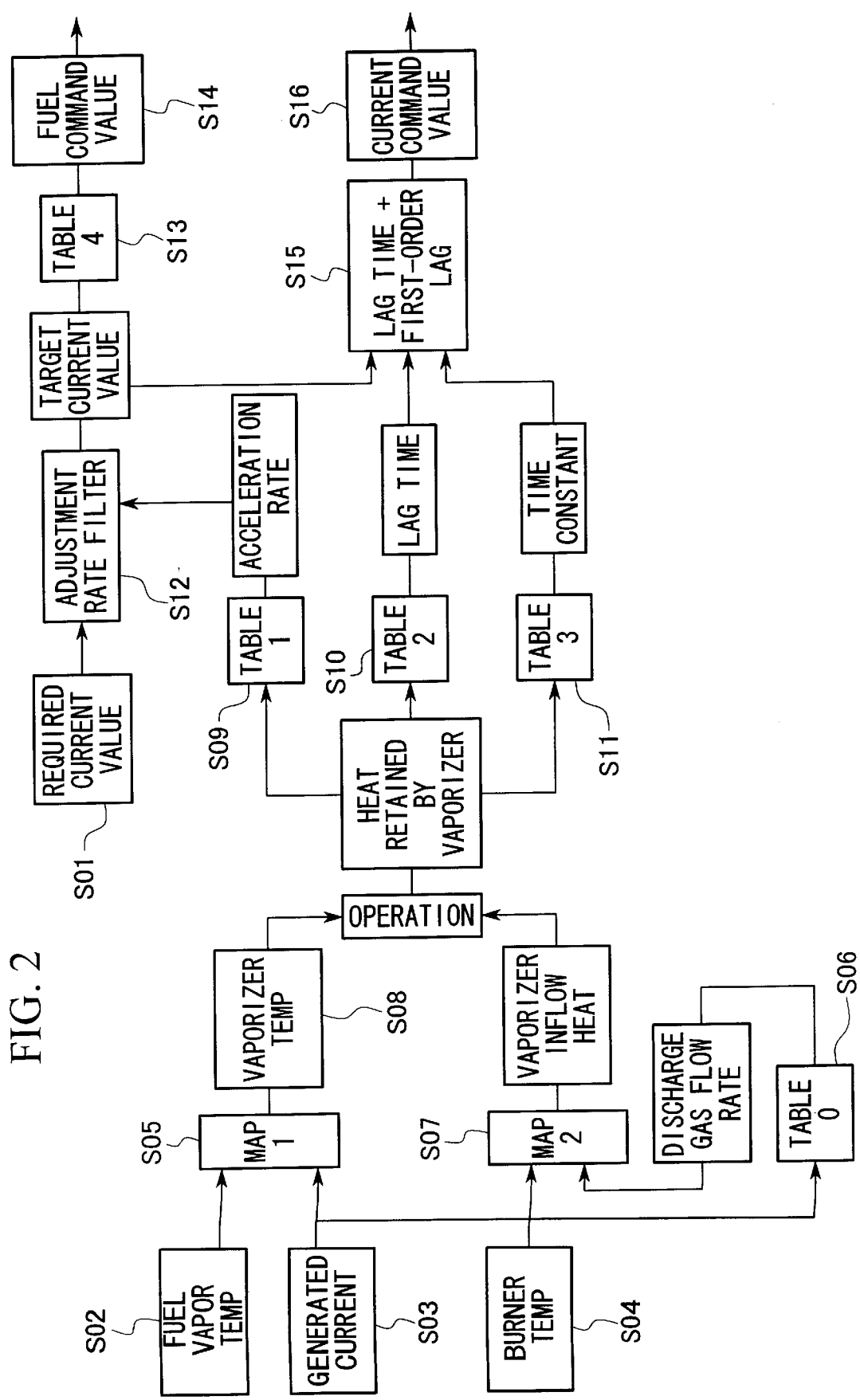
FIG. 2 is a flowchart showing the operation of the control unit for the fuel cell shown in FIG. 1.

FIG. 2 is a flowchart showing the operation of the control unit 10 for the fuel cell 11. FIGS. 3(a) through 3(g) are graphs indicating tables or maps which are used as references when calculating the fuel injection command and current generation command value. FIG. 4(a) is a graph showing the change in required current generation value versus time. FIG. 4(b) is a graph showing the change in target current generation value versus time. FIG. 4(c) is a graph showing the change in fuel injection amount versus time. FIG. 4(d) is a graph showing the change in current generation command value versus time.

In step S01, shown in FIG. 2, a required current generation value requested by the fuel cell 11 is computed in accordance with, for instance, the magnitude of operation of an accelerator pedal.

On the other hand, in step S02, the temperature of the fuel vapor supplied by the vapor generation unit 13 is detected by the fuel vapor temperature detector 21 and, in step S03, the current output from the fuel cell 11 is detected by the generated electric current detection unit 23. In step S04, the temperature of the combustion unit 14 (i.e., the burner temperature) is detected by the combustion unit temperature detector 22.

Figure 3A:
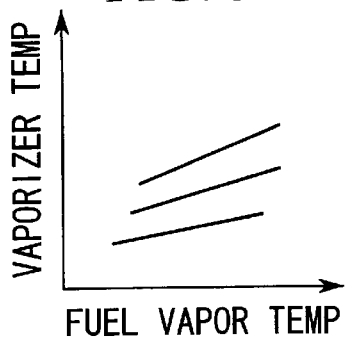
FIG. 3(a) is a graph which may be used as a reference when calculating a fuel injection command value and a current generation command value, showing the relationship between a vaporizer temperature and a fuel vapor temperature.
Figure 4A:
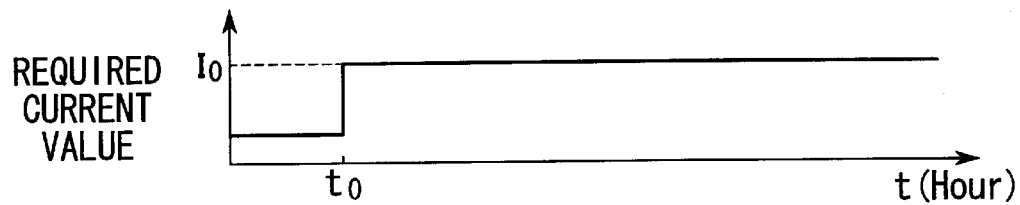
FIG. 4(a) is a graph showing the change in required current generation value versus time.
Figure 4B:
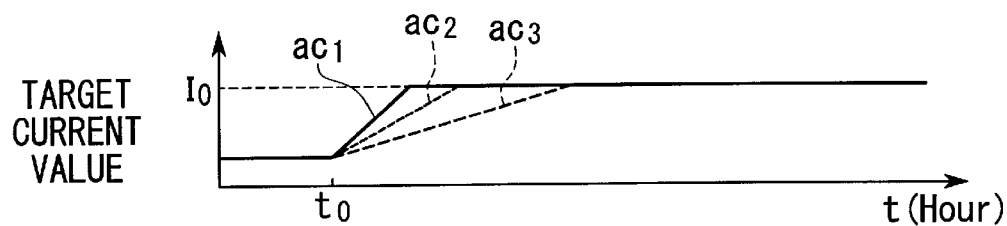
FIG. 4(b) is a graph showing the change in target current generation value versus time.
Figure 4C:
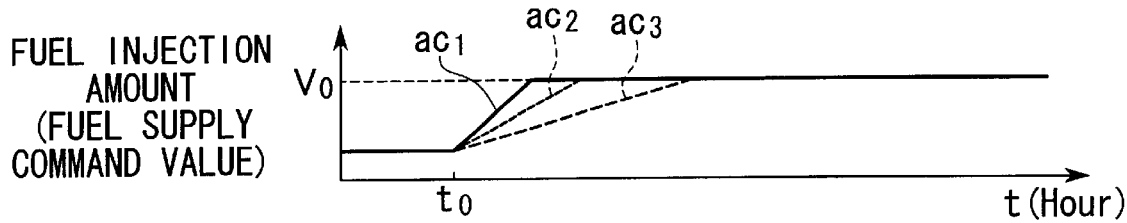
FIG. 4(c) is a graph showing the change in fuel injection amount versus time.
Figure 4D:
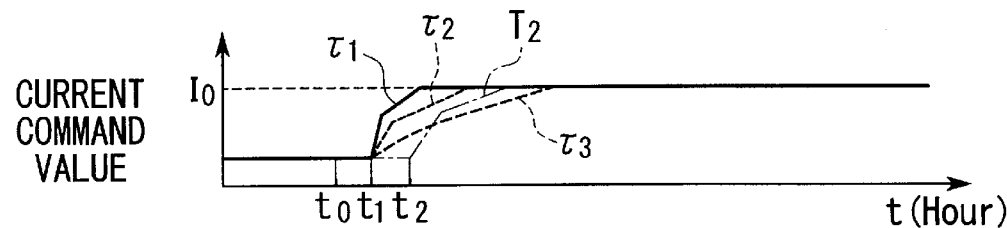
FIG. 4(d) is a graph showing the change in current generation command value versus time.

Then, in step S05, based on the detected fuel vapor temperature and the generated current, the MAP 1 shown in FIG. 3(a), for instance, which indicates the fuel vapor temperature which varies in accordance with the generated current, is searched to obtain the temperature of the vaporizer, i.e., the quantity of heat of the vapor generation unit 14 per se.

In the MAP 1 shown in FIG. 3(a), the temperature of the vaporizer is set to be increased as the fuel vapor temperature increases. Also, the rate of the temperature increase in the vaporizer with respect to the fuel vapor temperature is set to be increased as the magnitude of the generated current increases.

Figure 3B:
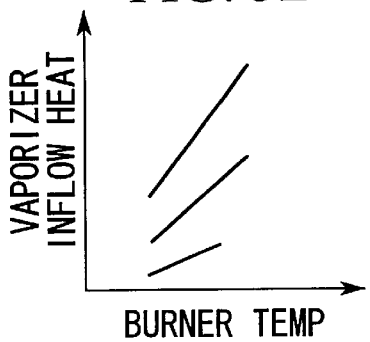
FIG. 3(b) is a graph which may be used as a reference when calculating a fuel injection command value and a current generation command value, showing the relationship between an inflow quantity of heat to the vaporizer and a burner temperature.
Figure 3C:
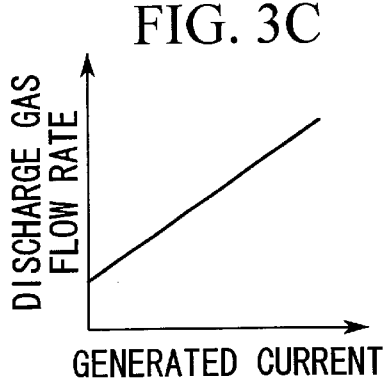
FIG. 3(c) is a graph which may be used as a reference when calculating a fuel injection command value and a current generation command value, showing the relationship between a flow rate of discharge gas and a generated current.

In step S06, based on the detected current generation, the TABLE 0 shown in FIG. 3(c), for instance, which indicates the increase in the flow rate of discharge gas in accordance with the increase in the generated current, is searched to obtain the flow rate of discharge gas.

Then, in step S07, based on the detected burner temperature and the searched discharge gas flow rate, the MAP 2 shown in FIG. 3(b), for instance, which indicates the change in the inflow quantity of heat to the vaporizer in accordance with the burner temperature, is searched to obtain the inflow quantity of heat to the vaporizer, i.e., the quantity of heat flows in the vapor generation unit 13.

Note that in the MAP 2 shown in FIG. 3(c), the inflow quantity of heat to the vaporizer is set to be increased as the burner temperature increases. Also, the rate of the inflow quantity of heat to the vaporizer with respect to the burner temperature is set to be increased as the flow rate of discharge gas increases.

After that, in step S08, the quantity of heat of the vapor generation unit 13 to vaporize the liquid fuel, i.e., the quantity of heat retained by the vaporizing unit, is calculated based on the searched vaporizer temperature and the inflow quantity of heat to the vaporizer.

Then, in step S09, based on the calculated quantity of heat retained by the vaporizing unit, the TABLE 1 shown in FIG. 3(d), for instance, which indicates the change in the acceleration rate in accordance with the quantity of heat retained by the vaporizing unit, is searched to obtain the acceleration rate which will be described later.

Also, in step S10, based on the calculated quantity of heat retained by the vaporizing unit, the TABLE 2 shown in FIG. 3(e), for instance, which indicates the change in "lag time" in accordance with the quantity of heat retained by the vaporizing unit, is searched to obtain the lag time which will be described later.

Moreover, in step S11, based on the calculated quantity of heat retained by the vaporizing unit, the TABLE 3 shown in FIG. 3(f), for instance, which indicates the change in time constant in accordance with the quantity of heat retained by the vaporizing unit, is searched to obtain the time constant which will be described later.

Then, in step S12, based on the searched acceleration rate, the target current generation value shown in FIG. 4(b) is calculated from the required current generation value shown in FIG. 4(a) using the adjustment rate filter.

For instance, as shown in FIG. 4(a), when a current value I0 is set as the required current generation value at an appropriate time t0, the target current generation value increases, from time t0, at a predetermined time-varying rate, i.e., acceleration rate to reach the current value I0.

Figure 3D:
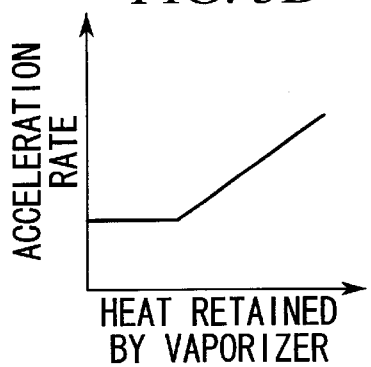
FIG. 3(d) is a graph which may be used as a reference when calculating a fuel injection command value and a current generation command value, showing the relationship between an acceleration rate and a quantity of heat retained by the vaporizing unit.

For this reason, as shown in FIG. 3(d), the acceleration rate is set to be a relatively small value when the quantity of heat retained by the vaporizing unit is small since the amount of heat to vaporize the liquid fuel is not sufficient. On the other hand, the acceleration rate is set to be a relatively large value when the quantity of heat retained by the vaporizing unit is large since the amount of heat to vaporize the liquid fuel is sufficient.

In FIG. 4(b), changes in the target current generation value versus time for each of a plurality of acceleration rates, three in this example, having a different magnitude (ac 1>ac 2>ac 3) are shown (ac 1 is indicated by a solid line, ac 2 is indicated by a dotted line, and ac 3 is indicated by a broken line).

Figure 3E:
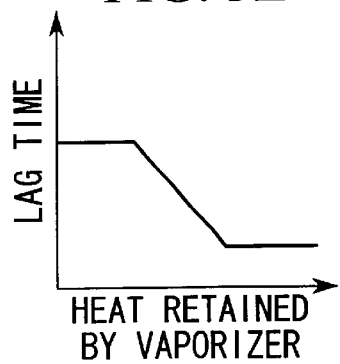
FIG. 3(e) is a graph which may be used as a reference when calculating a fuel injection command value and a current generation command value, showing the relationship between a lag time and a quantity of heat retained by the vaporizing unit.
Figure 3F:
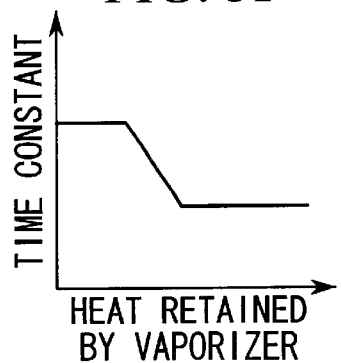
FIG. 3(f) is a graph which may be used as a reference when calculating a fuel injection command value and a current generation command value, showing the relationship between a time constant and a quantity of heat retained by the vaporizing unit.
Figure 3G:
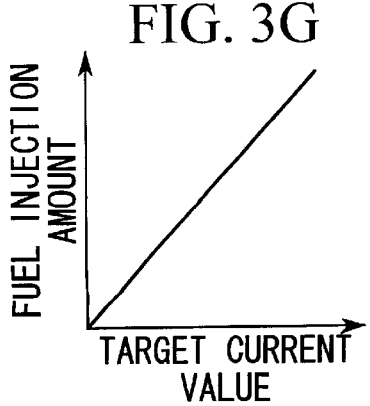
FIG. 3(g) is a graph which may be used as a reference when calculating a fuel injection command value and a current generation command value, showing the relationship between a fuel injection amount and a target current generation.

Next, in step S13, based on the calculated target current generation value, for instance, the TABLE 4 shown in FIG. 3(g), which indicates the fuel injection amount that increases in proportion to the target current generation, is searched to obtain the fuel injection amount shown in FIG. 4(c).

Then, in step S14, the searched fuel injection amount is output to, for instance, the fuel supply unit 12 as a fuel injection command value.

In FIG. 4(c), the change in the fuel injection amount versus time for each of three acceleration rates having a different magnitude (ac 1>ac 2>ac 3) is shown (ac 1 is indicated by a solid line, ac 2 is indicated by a dotted line, and ac 3 is indicated by a broken line).

In step S15, based on the searched lag time and time constant, for instance, a current generation command value indicated in FIG. 4(d) is calculated from the target current generation values shown in FIG. 4(b).

The term "lag time" means the time difference between the change in the required current generation value at time t0 and the start of the change in the current generation command value in association with the change in the required current generation value. The term "time constant" means a parameter relating to time in which the current generation command value starts to change and reaches the current value I0.

For instance, the solid line $\tau 1$, the dotted line $\tau 2$, and the broken line $\tau 3$ shown in FIG. 4(d) have the lag time of (t1−t0) with respect to the target current generation value having the acceleration rate of ac 1 (indicated by the solid line ac 1 shown in FIG. 4(b)), and indicate changes in the current generation command values when the time constant (especially, first-order lag) is set to be $\tau 1$, $\tau 2$, and $\tau 3$ ($\tau 1 < \tau 2 < \tau 3$), respectively.

Also, the dotted broken line T2 shown in FIG. 4(d), for instance, has the lag time of (t2−t0), and indicates a change in the current generation command value when the time constant (especially, first-order lag) is set to be $\tau 1$.

For this reason, as shown in FIGS. 3(e) and 3(f), the lag time and the time constant are set to be a relatively large values when the quantity of heat retained by the vaporizing unit is small since the amount of heat to vaporize the liquid fuel is not sufficient. On the other hand, the lag time and the time constant are set to be a relatively small value when the quantity of heat retained by the vaporizing unit is large since the amount of heat to vaporize the liquid fuel is sufficient.

Then, in step S16, the current generation command value, which is calculated by taking into account the lag time and the first-order lag, is output to the output control unit 24 including, for instance, a DC-DC converter and an inverter, etc., to control the current generated by the fuel cell 11.

As described above, according to the control unit 10 for a fuel cell of the embodiment of the present invention, it becomes possible to accurately calculate the acceleration rate for the fuel injection command value, and the lag time and the time constant for the current generation command value by estimating the quantity of heat retained by the vapor generation unit 13. Accordingly, it becomes possible, for instance, to improve the output responsiveness and current generation efficiency of the fuel cell 11 by improving the insufficiency in quantity of heat in the vapor generation unit 13 during the increase of load and preventing retention of the liquid fuel in the vapor generation unit 13.

Note that although the acceleration rate for the fuel injection command value, and the lag time and the time constant for the current generation command value are set in the above-mentioned embodiment, the present invention is not limited as such and any one of the acceleration rate, the lag time, and the time constant may be omitted. Also, it is possible to set one or more of control constants which may be suitably selected from the acceleration rate, the lag time, and the time constant.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only: the invention is limited and defined only by the following claims and equivalents thereto.

What is claimed is:

1. A control system for a fuel cell, comprising:
   a vapor generation unit which produces a fuel vapor by vaporizing a liquid fuel;
   a fuel reforming unit which reforms the fuel vapor so as to produce a hydrogen-enriched reformed fuel;
   a fuel supply unit which supplies the hydrogen-enriched reformed fuel from said fuel reforming unit to the fuel cell;
   a combustion unit which burns a discharged fuel discharged from the fuel cell and supplies quantity of heat generated by burning the discharged fuel to said vapor generation unit;
   a fuel vapor temperature detection unit which detects the temperature of the fuel vapor;
   a temperature detection unit which detects the temperature of the combustion unit;
   a current detection unit which detects the current generated by the fuel cell; and
   a control unit which calculates a quantity of heat retained by said vapor generation unit utilized for vaporizing the liquid fuel based on the temperature of the fuel vapor, the temperature of said combustion unit, and the generated current, said control unit controlling a fuel supply command value for said fuel supply unit and/or a current generation command value for the fuel cell based on the calculated quantity of heat retained by said vapor generation unit.

2. A control system for a fuel cell as set forth in claim 1, wherein said control unit sets a control constant for the fuel supply command value and/or the current generation command value, the control constant comprising at least one of a lag time, a time constant, and an acceleration rate.

3. A vehicle utilizes a fuel cell as an energy source, comprising:

a control system for the fuel cell which includes:

a vapor generation unit which produces a fuel vapor by vaporizing a liquid fuel;

a fuel reforming unit which reforms the fuel vapor so as to produce a hydrogen-enriched reformed fuel;

a fuel supply unit which supplies the hydrogen-enriched reformed fuel from said fuel reforming unit to the fuel cell;

a combustion unit which burns a discharged fuel discharged from the fuel cell and supplies quantity of heat generated by burning the discharged fuel to said vapor generation unit;

a fuel vapor temperature detection unit which detects the temperature of the fuel vapor;

a temperature detection unit which detects the temperature of the combustion unit;

a current detection unit which detects the current generated by the fuel cell; and a control unit which calculates a quantity of heat retained by said vapor generation unit utilized for vaporizing the liquid fuel based on the temperature of the fuel vapor, the temperature of said combustion unit, and the generated current, said control unit controlling a fuel supply command value for said fuel supply unit and/or a current generation command value for the fuel cell based on the calculated quantity of heat retained by said vapor generation unit.

4. A vehicle as set forth in claim 1, wherein said control unit sets a control constant for the fuel supply command value and/or the current generation command value, the control constant comprising at least one of a lag time, a time constant, and an acceleration rate.

* * * * *